United States Patent
Ando et al.

(10) Patent No.: US 12,539,045 B2
(45) Date of Patent: Feb. 3, 2026

(54) PHOTOELECTRIC VOLUME PULSE WAVE SENSOR AND PULSE WAVE DETECTION METHOD

(71) Applicant: KONICA MINOLTA, INC., Tokyo (JP)

(72) Inventors: Kosuke Ando, Akishima (JP); Shusaku Kon, Hino (JP); Ryo Nakabayashi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 219 days.

(21) Appl. No.: 18/564,551

(22) PCT Filed: Mar. 14, 2022

(86) PCT No.: PCT/JP2022/011160
§ 371 (c)(1),
(2) Date: Nov. 27, 2023

(87) PCT Pub. No.: WO2022/254866
PCT Pub. Date: Dec. 8, 2022

(65) Prior Publication Data
US 2024/0285174 A1    Aug. 29, 2024

(30) Foreign Application Priority Data
Jun. 1, 2021 (JP) .................. 2021-092032

(51) Int. Cl.
*A61B 5/0205* (2006.01)
*A61B 5/00* (2006.01)
(Continued)

(52) U.S. Cl.
CPC .......... *A61B 5/0205* (2013.01); *A61B 5/1126* (2013.01); *A61B 5/681* (2013.01); *A61B 5/022* (2013.01); *A61B 5/02416* (2013.01)

(58) Field of Classification Search
CPC ..... A61B 5/0205; A61B 5/1126; A61B 5/681; A61B 5/022; A61B 5/02416;
(Continued)

(56) References Cited

U.S. PATENT DOCUMENTS

2002/0095092 A1* 7/2002 Kondo .............. A61B 5/02116
                                                       600/490
2014/0058217 A1  2/2014 Giovangrandi
2022/0190188 A1* 6/2022 Olson .................. A61B 5/0075

FOREIGN PATENT DOCUMENTS

JP  2004173841 A   6/2004
JP  2010264126 A  11/2010
WO  2015129843 A1  9/2015

OTHER PUBLICATIONS

Japanese Office Action (and an English language translation thereof) dated Jul. 8, 2025, issued in counterpart Japanese Application No. 2023-525417.
(Continued)

*Primary Examiner* — Eugene T Wu
(74) *Attorney, Agent, or Firm* — Holtz, Holtz & Volek PC

(57) ABSTRACT

A photoelectric volume pulse wave sensor includes a light-emitting element and a light-receiving element. Electrodes constituting the light-emitting element or the light-receiving element are surface electrodes. At least one electrode among the electrodes is also used as an electrode that detects body motion.

8 Claims, 12 Drawing Sheets

(51) Int. Cl.
*A61B 5/11* (2006.01)
*A61B 5/022* (2006.01)
*A61B 5/024* (2006.01)

(58) Field of Classification Search
CPC .............. A61B 5/02427; A61B 5/6824; A61B 5/02438; A61B 5/0261; A61B 5/0295; A61B 5/6826
See application file for complete search history.

(56) References Cited

OTHER PUBLICATIONS

International Search Report (ISR) (and English language translation thereof) dated May 24, 2022 issued in International Application No. PCT/JP2022/011160.
Written Opinion dated May 24, 2022 issued in International Application No. PCT/JP2022/011160.
International Preliminary Report on Patentability (IPRP) (and an English language translation thereof) dated Nov. 21, 2023, issued in International Application No. PCT/JP2022/011160.
Japanese Office Action (and an English language translation thereof) dated Nov. 11, 2025, issued in counterpart Japanese Application No. 2023-525417.

* cited by examiner

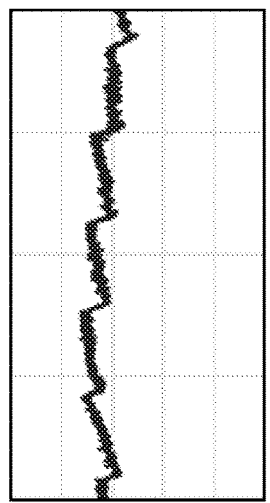
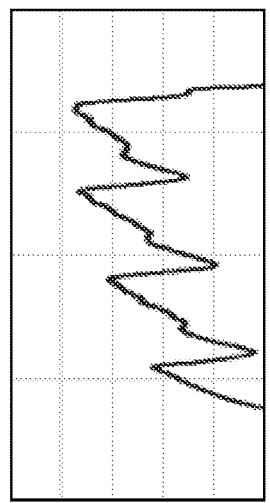
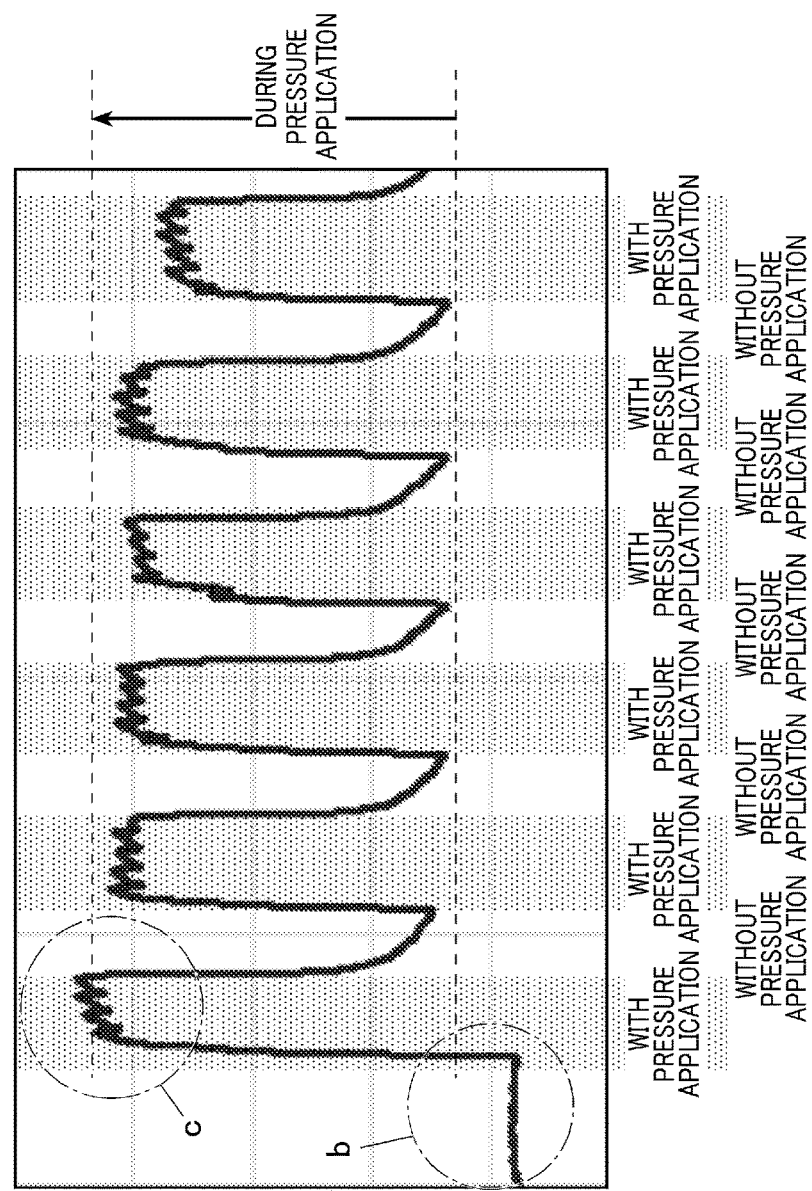

PHOTOELECTRIC VOLUME PULSE WAVE SENSOR AND PULSE WAVE DETECTION METHOD

TECHNICAL FIELD

The present invention relates to a photoelectric volume pulse wave sensor, and a pulse wave detection method, and in particular, to a photoelectric volume pulse wave sensor or the like that has a small number of components, can lower costs, and can more accurately detect body motion and pulse waves.

DESCRIPTION OF THE RELATED ART

In recent years, telemedicine, where health conditions are measured outside of hospitals, and medical services are received, has been actively discussed. A device that always allows measurement by an object person themself has been demanded.

In particular, user-friendly devices that (1) allow non-invasive measurement, (2) have a good wearable capability, and (3) allow stable measurement at a high accuracy, and can obtain vital data, have been demanded. Among such devices, a photoelectric volume pulse wave (Photo Plethysmo Graphy) sensor (hereinafter, sometimes simply called "PPG sensor") has been adopted for a pulse oximeter and a smartwatch, and has thus been attracting attention.

The PPG sensor is a sensor that includes a light-emitting element and a light-receiving element, causes a photoelectric effect by irradiating the light-receiving element with light from the light-emitting element, and converts the light into electricity, thus obtaining a signal from a measurement target. For example, in a case where the measurement target is body tissue including blood vessels, during transmission through or reflection by the living body, pulse waves due to pulsating blood vessels can be detected.

However, when pulse waves are measured by the PPG sensor, the measurement position is changed by expansion and contraction of skin due to body motion, a gap occurs between a device and a living body, and external light is detected. Accordingly, signals of variation in light attenuation in body tissue and of the external light are included, and it is thus difficult to detect accurate pulse waves.

Conventionally, besides the PPG sensor, a sensor that detects body motion is provided, and a method of processing a PPG signal and a body motion signal and thus extracting only a pulse wave signal is adopted. Any of an acceleration sensor, a capacitance sensor, and an optical sensor is used as the sensor that detects body motion. Preferably, it has been known that by applying an appropriate pressure on a measurement site, a clearer pulse wave form is obtained.

However, for these sensors, the body motion sensor is provided separately from the PPG sensor. Consequently, there is a problem that the cost is increased because the number of components is large, and body motion cannot be accurately detected because the positions of the PPG sensor and the body motion sensor do not coincide with each other.

For example, Patent Literature 1 discloses a method of removing noise from a PPG sensor by the PPG sensor and a capacitive body motion sensor.

CITATION LIST

Patent Literature

Patent Literature 1

U.S. Patent Application Publication No. 2014/0058217

SUMMARY OF THE INVENTION

Technical Problem

The present invention has been made in view of the problems and situations described above, and has an object to provide a photoelectric volume pulse wave sensor and a pulse wave detection method that have a small number of components, can lower costs, and can more accurately detect body motion and pulse waves.

Solution to Problem

To solve the object described above, in a process of discussing the causes and the like of the problems described above, the present inventors have found that by using least one electrode among electrodes constituting the light-emitting element or the light-receiving element also as an electrode that detects body motion, the number of components is smaller and the cost can be reduced, and body motion and pulse waves can be more accurately detected, thus achieving the present invention.

That is, the object according to the present invention is achieved by the following solution.

1. A photoelectric volume pulse wave sensor, including: a light-emitting element, and a light-receiving element,
   wherein electrodes constituting the light-emitting element or the light-receiving element are surface electrodes, and at least one electrode among the electrodes is also used as an electrode that detects body motion.

2. The photoelectric volume pulse wave sensor according to the first item,
   wherein light emitted to a living body transmits through the living body or is reflected by the living body, enters the light-receiving element, is photoelectrically converted, and thus allows pulse waves to be detected.

3. The photoelectric volume pulse wave sensor according to the first or second item,
   wherein a light transmissive elastic dielectric layer that is in contact with a measurement site of a living body when the photoelectric volume pulse wave sensor is attached to the measurement site is provided on a surface of the electrode that detects the body motion.

4. A pulse wave detection method using the photoelectric volume pulse wave sensor according to any one of the first to third items,
   wherein electrodes constituting the light-emitting element or the light-receiving element are configured as surface electrodes, and at least one electrode among the electrodes is also used to detect body motion, and
   pulse wave data and body motion data obtained using the photoelectric volume pulse wave sensor are optimized respectively, and a difference therebetween is obtained.

5. The pulse wave detection method according to the fourth item,
   wherein in a case where a pulsatile component in a signal corresponding to an absorbance of light detected by the light-receiving element is assumed as AC, and a non-pulsatile component is assumed as DC, an error indication is displayed when a perfusion index (PI) represented by a following Expression (1) is less than 0.5%, and normality is determined and measurement is performed when the PI is equal to or higher than 0.5%, $$PI(\%)=AC/DC\times100. \quad \text{Expression (1):}$$

6. The pulse wave detection method according to the fourth or fifth item,
wherein a light transmissive elastic dielectric layer that is in contact with a measurement site of a living body when the photoelectric volume pulse wave sensor is attached to the measurement site is provided on a surface of the electrode that detects the body motion, and pulse waves and the body motion are detected.

7. The pulse wave detection method according to the sixth item,
wherein in plan view, a contact area at a location overlapping the electrode that detects the body motion in a contact area of the elastic dielectric layer in contact with the measurement site is configured to be equal to or larger than 200 mm².

8. The pulse wave detection method according to any one of the fourth to seventh items,
wherein a pressure applied to a measurement site of a living body wearing the photoelectric volume pulse wave sensor is configured to be equal to or higher than 0.02 N/cm².

Advantageous Effects of Invention

The aforementioned measures of the present invention can provide a photoelectric volume pulse wave sensor and a pulse wave detection method that have a small number of components, can lower costs, and can more accurately detect body motion and pulse waves.

Although the exerting mechanism or the operation mechanism of the advantageous effects of the present invention are not clear, it is inferred as follows.

The photoelectric volume pulse wave sensor according to the present invention also uses at least one electrode among the electrodes constituting the light-emitting element or the light-receiving element, as the electrode that detects body motion. Accordingly, unlike the conventional case, without separately providing the body motion sensor, the number of components can be reduced, and pulse waves and body motion can be inexpensively detected.

The position for detecting pulse waves, and the position for detecting body motion coincide with each other. Accordingly, the body motion can be accurately detected, and the pulse waves where the body motion is removed can be highly accurately detected by removing body motion data from pulse wave data including noise and the like.

BRIEF DESCRIPTION OF THE DRAWINGS

FIG. 15A shows a result of Example.
FIG. 15B shows a result of Example.
FIG. 15C shows a result of Example.

DETAILED DESCRIPTION

Figure 1:
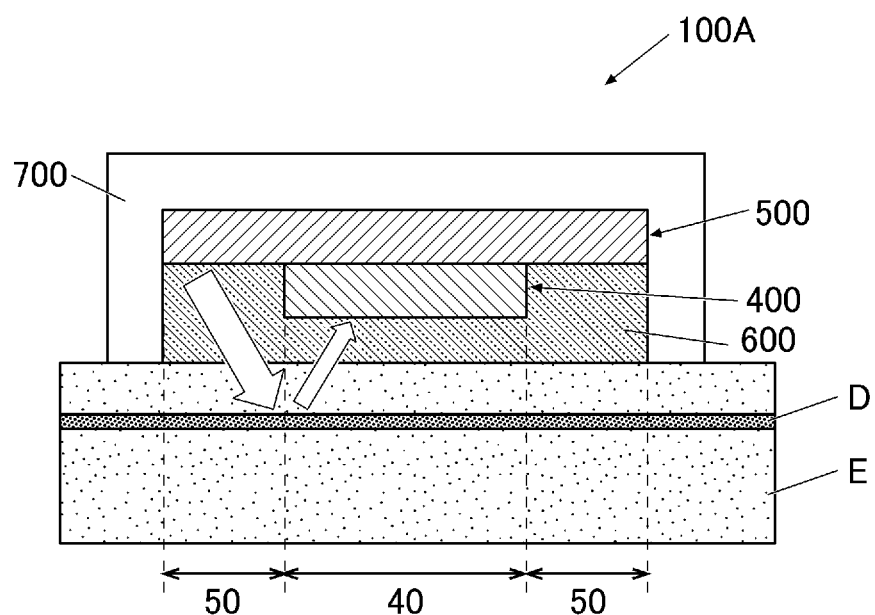
FIG. 1 is a sectional view showing an example of a configuration of a reflective type photoelectric volume pulse wave sensor according to the present invention.

A photoelectric volume pulse wave sensor according to the present invention is a photoelectric volume pulse wave sensor that includes a light-emitting element, and a light-receiving element. Electrodes constituting the light-emitting element or the light-receiving element are surface electrodes. At least one electrode among the electrodes is also used as an electrode that detects body motion.

The characteristics are technical characteristics common or corresponding to the following embodiments.

Preferably, according to the embodiment of the present invention, light emitted to a living body passes through the living body or is reflected on the inside of the living body, then enters the light-receiving element, and is photoelectrically converted to thereby allow pulse waves to be detected, that is, effective use can be achieved for a reflective type or a transmissive type.

The configuration providing a light transmissive elastic dielectric layer that is in contact with a measurement site of a living body when the photoelectric volume pulse wave sensor is attached to the measurement site, on a surface of the electrode that detects the body motion, is preferable in terms of improvement of the detection accuracy of body motion and pulse waves.

The pulse wave detection method according to the present invention is a pulse wave detection method using the photoelectric volume pulse wave sensor wherein electrodes constituting the light-emitting element or the light-receiving element are configured as surface electrodes, and at least one electrode among the electrodes is also used to detect body motion, and pulse wave data and body motion data obtained using the photoelectric volume pulse wave sensor are optimized respectively, and a difference therebetween is obtained. Accordingly, the number of components is small, the cost can be reduced, and the body motion and pulse waves can be more accurately detected.

In a case where a pulsatile component in a signal corresponding to an absorbance of light detected by the light-receiving element is assumed as AC, and a nonpulsatile component is assumed as DC, an error indication is displayed when a perfusion index (PI) represented by the following Expression (1) is less than 0.5%, and normality is determined and measurement is performed when the PI is equal to or higher than 0.5%, which is preferable in terms of improvement of the detection accuracy of body motion and pulse waves.

A light transmissive elastic dielectric layer that is in contact with a measurement site of a living body when the photoelectric volume pulse wave sensor is attached to the measurement site is provided on a surface of the electrode that detects the body motion, and pulse waves and body motion are detected, which is preferable in terms of improvement of the detection accuracy of the body motion and pulse waves.

In plan view, a contact area at a location overlapping the electrode that detects the body motion in a contact area of the elastic dielectric layer in contact with the measurement site is configured to be equal to or larger than 200 mm$^2$, which is preferable because the close contact property with the measurement site is favorable and variation in measurement can be reduced.

A pressure applied to the measurement site of the living body wearing the photoelectric volume pulse wave sensor is configured to be in a range from 0.02 N/cm$^2$ to (maximum blood pressure [N/cm$^2$]+0.4 [N/cm$^2$]), which is preferable because measurement can be achieved without application of an excessive pressure to the living body.

Hereinafter, the present invention and its configuration elements, and embodiments and modes for implementing the present invention are described. Note that in the present application, "–" is used as a meaning that numerical values described before and after it are included respectively as a lower limit value and a upper limit value.

[Overview of Photoelectric Volume Pulse Wave Sensor in Present Invention]

A photoelectric volume pulse wave sensor according to the present invention is a photoelectric volume pulse wave sensor that includes a light-emitting element, and a light-receiving element. Electrodes constituting the light-emitting element or the light-receiving element are surface electrodes. At least one electrode among the electrodes is also used as an electrode that detects body motion.

In the present invention, "surface electrode" is a planar flat plate electrode.

"Body motion" is variation due to a motion of a body of a measurement subject and vibrations. "Body motion data" is waveform data of an electrical signal where the variation is captured as a waveform.

In "pulse waves", the blood vessel volume variation caused due to pumping of blood by a heart is captured as a waveform, and "pulse wave data" is waveform data of an electrical signal where the blood vessel volume variation is captured as a waveform.

The photoelectric volume pulse wave sensor according to the present invention can be used as a reflective type or a transmissive type. In the reflective type, light emitted to a living body from the light-emitting element is reflected on the inside of the living body, enters the light-receiving element, and is photoelectrically converted, allowing pulse waves to be detected. In the transmissive type, light emitted to the living body from the light-emitting element transmits through the living body, enters the light-receiving element, and is photoelectrically converted, allowing pulse waves to be detected.

Hereinafter, the configurations of the reflective type photoelectric volume pulse wave sensor and the type transmissive photoelectric volume pulse wave sensor are described in this order.

[Reflective Photoelectric Volume Pulse Wave Sensor]

Figure 2:
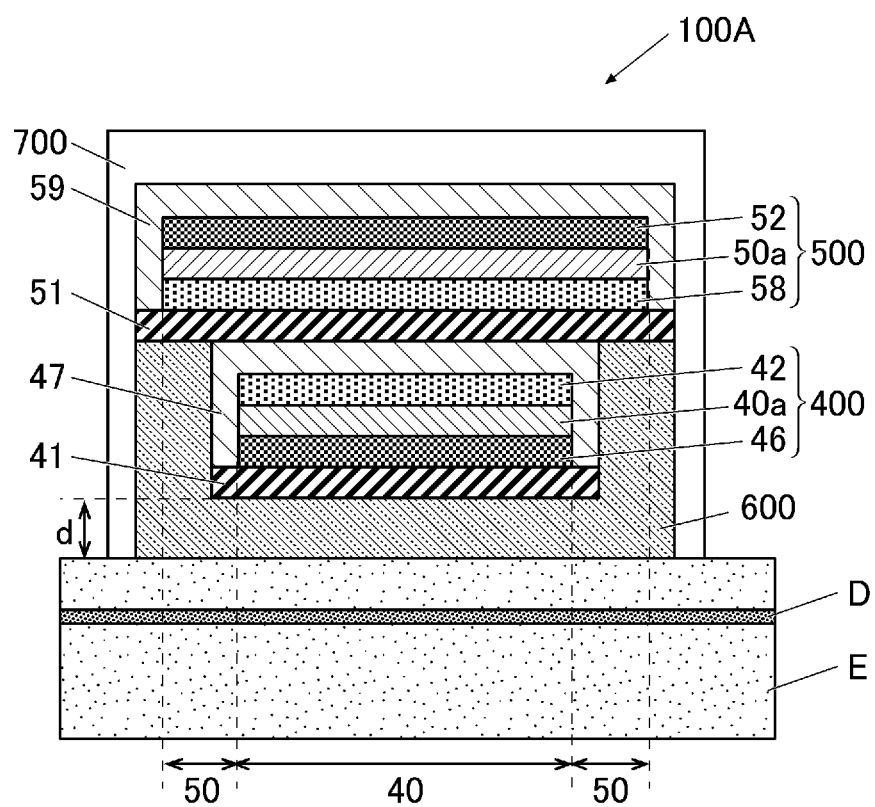
FIG. 2 is a sectional view showing details of the configuration of the reflective type photoelectric volume pulse wave sensor in FIG. 1.

FIG. 1 is a sectional view showing an example of a configuration of a reflective type photoelectric volume pulse wave sensor according to the present invention. FIG. 2 is a sectional view showing the details of the configuration of the reflective photoelectric volume pulse wave sensor in FIG. 1.

As shown in FIG. 1, the reflective type photoelectric volume pulse wave sensor (hereinafter also called "reflective photoelectric volume pulse wave sensor) 100A is attached to a measurement site of a living body E.

Although not shown, the measurement site of the living body E includes, in order from the surface: an epidermis; a dermis; and a hypodermis. Capillaries extend between the epidermis and the dermis. Arterioles extend between the dermis and the hypodermis. Arteries D extend below the arterioles.

The reflective photoelectric volume pulse wave sensor 100A includes a light-emitting element 500, and a light-receiving element 400. Preferably, the sensor further includes a light transmissive elastic dielectric layer 600.

Specifically, the reflective photoelectric volume pulse wave sensor 100A includes the elastic dielectric layer 600, the light-receiving element 400, and the light-emitting element 500, in this order from the upper surface of the measurement site of the living body E. The measurement site in this case may be, for example, a site (wrist) that is not light transmissive.

In FIG. 1, the light-receiving element 400 is buried in the elastic dielectric layer 600 substantially at the center in plan view. However, there is no limitation to this.

The light-emitting element 500 is provided on the elastic dielectric layer 600 in which the light-receiving element 400 is buried. Preferably, the sizes of the light-emitting element 500 and the elastic dielectric layer 600 have similar sizes in plan view, the size of the light-receiving element 400 in plan view is smaller than the size of the light-emitting element 500 in plan view, and the light-receiving element 400 has a size that can be stored in the light-emitting element 500 in plan view.

Furthermore, the light-emitting element 500, the light-receiving element 400, and the elastic dielectric layer 600 as described above are stored in a housing 700. The shapes of the light-emitting element 500 and the light-receiving element 400 in plan view may be a rectangular shape, a circular shape, or another shape.

As for the reflective photoelectric volume pulse wave sensor 100A that includes the light-emitting element 500 and the light-receiving element 400 as described above, in FIG. 2, a symbol 50 denotes a light emitter, and a symbol 40 denotes a light receiver. Here, "light emitter 50" is a region that includes a layer 50a (light-emitting function layer (specifically, an electron injection layer 53, an electron transport layer 54, a light emitting-layer 55, a hole transport layer 56, and a hole injection layer 57 (see FIGS. 5A and 5B))) that is in the light-emitting element 500 and functions for actual light emission, and electrodes (an anode 58 and a cathode 52) that overlap the layer, and is substantially for injection into the living body. That is, an electrode (anode 42) closer to the light-emitting element 500 between the two electrodes (the anode 42 and a cathode 46) in the light-receiving element 400 is made of a light reflecting material. Accordingly, light emitted from the light-emitting element 500 passes through locations other than the electrode 42, and enters the living body E, thus emitting light.

The "light receiver 40" means a region that includes a layer 40a that actually functions for receiving light (light-receiving function layer), and electrodes (the anode 42 and the cathode 46) overlapping this layer in the light-receiving element 400.

Note that the details of configurations of the light-emitting element 500 and the light-receiving element 400 (FIGS. 2, 5A, 5, 6A, and 6B) are described later.

In the present invention, at least one electrode among the electrodes (52, 58, 42, and 46) constituting the light-emitting element 500 or the light-receiving element 400 is also used as a body motion detection electrode that detects body motion. In particular, it is preferable to also use the anode of the light-emitting element as the body motion detection electrode.

The body motion detection electrode functions as a capacitive pressure sensor while assuming the living body E as the other electrode, and detects body motion of the measurement subject. That is, alternate current is flown through the body motion detection electrode, and based on the value of current flowing through the body motion detection electrode, the variation in electrostatic capacitance between the body motion detection electrode and the measurement site of the living body is detected. As the contact area of the photoelectric volume pulse wave sensor with the measurement site varies, and the pressure applied on the measurement site and the body motion detection electrode varies, the electrostatic capacitance between the body motion detection electrode and the measurement site varies, and the varying electrostatic capacitance is output as body motion data.

[Transmissive Photoelectric Volume Pulse Wave Sensor]

Figure 3:
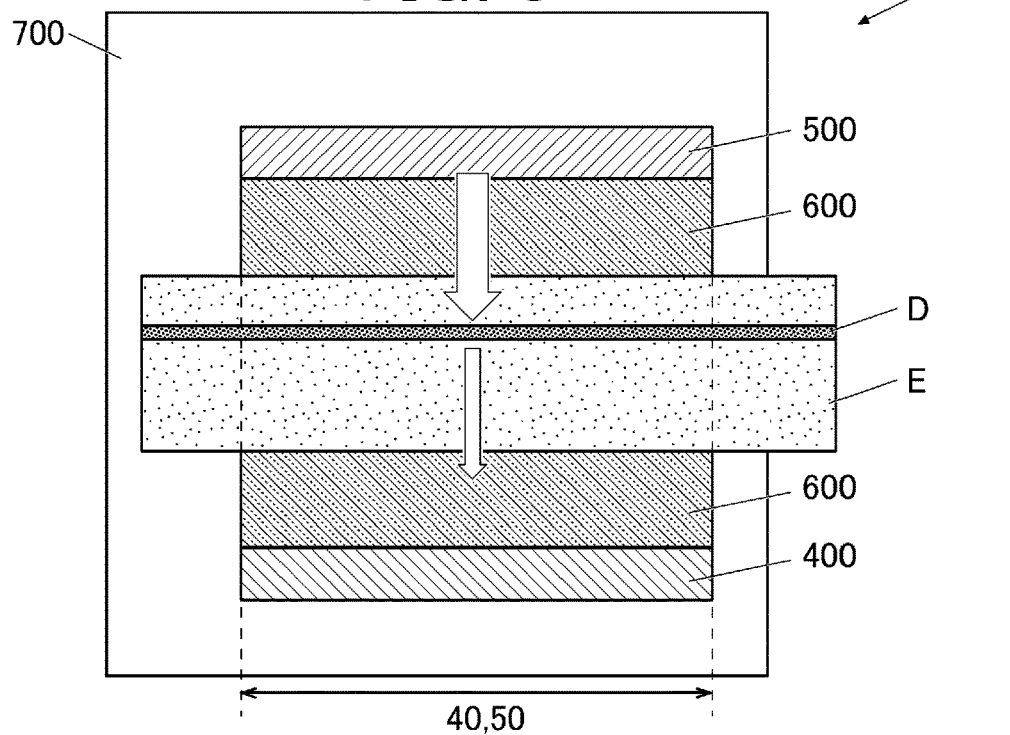
FIG. 3 is a sectional view showing an example of a configuration of a transmissive type photoelectric volume pulse wave sensor according to the present invention.
Figure 4:
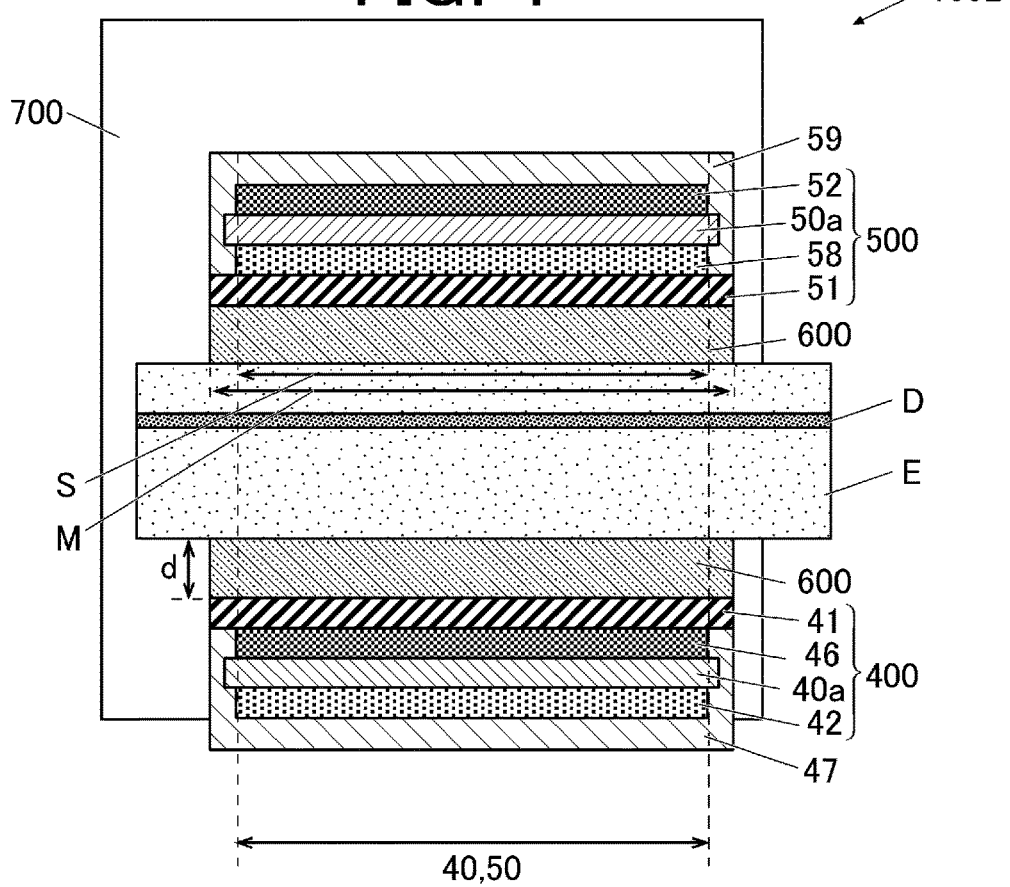
FIG. 4 is a sectional view showing details of the configuration of the transmissive type photoelectric volume pulse wave sensor in FIG. 3.

FIG. 3 is a sectional view showing an example of a configuration of a transmissive type photoelectric volume pulse wave sensor according to the present invention. FIG. 4 is a sectional view showing the details of the configuration of the transmissive type photoelectric volume pulse wave sensor in FIG. 3.

As shown in FIG. 3, the transmissive type photoelectric volume pulse wave sensor (hereinafter also called "transmissive photoelectric volume pulse wave sensor") 100B is attached to a measurement site of a living body E.

Similar to the reflective photoelectric volume pulse wave sensor 100A, the transmissive photoelectric volume pulse wave sensor 100B also includes a light-emitting element 500, and a light-receiving element 400. Preferably, the sensor further includes a light transmissive elastic dielectric layer 600.

Specifically, in the transmissive photoelectric volume pulse wave sensor 100B, the light-emitting element 500 is provided on an upper surface of the measurement site of the living body E via the elastic dielectric layer 600, and the light-receiving element 400 is provided on a lower surface of the measurement site via the elastic dielectric layer 600. That is, the light-emitting element 500 and the light-receiving element 400 are arranged opposite to each other, and the measurement site of the living body E is arranged between the light-emitting element 500 and the light-receiving element 400. The measurement site in this case may be, for example, a light transmissive site (a fingertip, or an earlobe).

In FIG. 3, it is preferable that the light-emitting element 500 and the light-receiving element 400 should have similar sizes in plan view. Preferably, it is at least configured that the light-receiving element 400 has a size in plan view that can be stored in the light-emitting element 500.

Furthermore, the light-emitting element 500, the elastic dielectric layer 600, the light-receiving element 400, and the elastic dielectric layer 600 as described above are stored in a housing 700. The shapes of the light-emitting element 500 and the light-receiving element 400 in plan view may be a rectangular shape, a circular shape, or another shape. Note that the details of configurations of the light-emitting element 500 and the light-receiving element 400 (FIGS. 4, 5A, 5B, 6A, and 6B) are described later.

Also in the transmissive type photoelectric volume pulse wave sensor 100B, at least one electrode among the electrodes (the anode 42 and the cathode 46) constituting the light-emitting element 500 or the light-receiving element 400 is also used as a body motion detection electrode that detects body motion. In particular, it is preferable to also use the anode of the light-emitting element as the body motion detection electrode.

[Functions of Photoelectric Volume Pulse Wave Sensor]

The photoelectric volume pulse wave sensor according to the present invention causes the light-emitting element serving as a light source, such as a light-emitting diode, to irradiate a measurement site of body tissue with light, causes the light-receiving element serving as a light detection sensor, such as a photodiode, to detect light having been reflected by or transmitted through the measurement site of the body tissue, and measures variation in volume pulse waves and the like of the body tissue, based on the detected signal.

In particular, the photoelectric volume pulse wave sensor according to the present invention can detect body motion by also using the electrode of the light-emitting element or the light-receiving element as the body motion detection electrode, and obtain the difference between the obtained pulse wave data and body motion data, which can extract only pulse wave data where noise and the like have been removed.

For example, light emitted from the light-emitting element passes through the epidermis and reaches blood vessels in the back. The light having reached the blood vessels is absorbed or reflected by blood flowing through the blood vessels, or passes through the blood.

Among such components, a light component scattered by blood vessel tissue and blood enters the light-receiving element. Accordingly, the light-receiving element outputs photocurrent in accordance with the intensity of incident light. Here the blood vessels are repetitively expanded and contracted at the same cycle as the heartbeat. Accordingly, since the intensity of reflected light increases and decreases at the same cycle as the cycle of expansion and contraction of blood vessels, the variation in photocurrent output from the light-receiving element indicates the blood vessel volume variation.

The photoelectric volume pulse wave sensor according to the present invention is applicable also as a sensor that detects the oxygen saturation of arterial blood. Hemoglobin in blood has different absorbances with red light and infrared light depending on presence or absence of combination with oxygen. Multiple pairs of elements with different emission wavelengths and reception wavelengths, such as elements that emit and receive red light and elements that emit and receive infrared light, are prepared, and reflected light thereat is measured and analyzed, thereby allowing detection of the oxygen saturation.

Also in such detection of the oxygen saturation, the oxygen saturation can be more accurately detected by subtracting the body motion data described above.

Note that the blood vessels are arteries.

In the present invention, "volume pulse waves" have waveforms when variation in pressure in blood vessels due to pulsation causes volume variation, and allow variation in blood vessels to be directly grasped.

The "photoelectric volume pulse waves" indicate a waveform detected using transmission or reflection of light through or on blood in order to detect volume pulse waves.

[Oxygen Saturation Calculation Method]

Typically, to measure the oxygen saturation in blood, the photoelectric volume pulse wave sensor (pulse oximeter) is used. The pulse oximeter irradiates a finger with light components having two wavelengths included in a wavelength region from red to infrared, and their transmittance and reflectance are measured.

Specifically, blood hemoglobin (Hb) is present in four types of states of oxygenated hemoglobin (O$_2$Hb), reduced hemoglobin (HHb), methaemoglobin (MetHb), and carbonmonoxyhemoglobin (COHb). MetHb and COHb are abnormal hemoglobin that increases in case of methemoglobinemia and carbon monoxide poisoning. Accordingly, the oxygen saturation is generally determined by the ratio between O$_2$Hb and O$_2$Hb+HHb. When red light is caused to pass through hemoglobin (Hb), the absorbance of HHb with red light is significantly higher than the absorbance of O$_2$Hb with red light, and largely varies depending on the wavelength of red light. When near-infrared light is caused to pass through hemoglobin (Hb), the absorbance of HHb with near-infrared light is slightly lower than the absorbance of O$_2$Hb with near-infrared light. Accordingly, the ratio R (absorbance of red light/absorbance of near-infrared light) between the absorbance of hemoglobin with red light and the absorbance with near-infrared light varies depending on the oxygen saturation that is the ratio between O$_2$Hb and O$_2$Hb+HHb in blood.

At a measurement site, such as a finger, a wrist, the back of an arm, a chest, or an abdomen, there are arterial blood, venous blood, tissue, and a bone, which affect the absorbance of red light and the absorbance of near-infrared light. Among them, a part to which the volume variation of vascular volume pulse waves contributes is arterial blood.

Signals corresponding to the absorbance detected by the light-receiving element are roughly classified into two types that are a signal due to pulsation of arterial blood (also called "pulsatile component" or "AC"), and a signal absorbed by an arterial blood nonpulsatile component, venous blood, body tissue, a bone and the like (also called "nonpulsatile component" or "DC").

For example, the pulsatile component of the absorbance of red light with a wavelength of 660 nm is assumed as AC660, and the DC component is assumed as DC660. For example, the AC component of the absorbance of near-infrared light with a wavelength of 940 nm is assumed as AC940, and the DC component is assumed as DC940. The ratio R between the absorbance of red light and the absorbance of near-infrared light (absorbance of red light/absorbance of near-infrared light) is represented by the following Expression (I).

Expression (1)

$$R = \frac{\text{Absorbance of red light}}{\text{Absorbance of infrared light}} = \frac{AC660/DC660}{AC940/DC940} \quad (1)$$

The blood oxygen saturation is obtained based on the R value calculated by the Expression (I), and on a preliminarily empirically obtained calibration curve that represents the relationship between the R value and percutaneous arterial blood oxygen saturation (SpO$_2$).

In general, in a case in which a finger, a wrist (e.g., an ulnar side or a radial side), the back of an arm, a chest, a chest or the like is irradiated with red light and near-infrared light, and absorbances are measured, the temporal change in absorbances is measured as waveforms in which pulse waves are reflected. Accordingly, the AC component of the absorbance can be identified by calculating the difference between the maximum and the minimum of the temporal change in absorbance. The DC component of the absorbance can be identified by calculating the mean of the temporal change in absorbance.

The perfusion index (PI) that is represented by the following Expression (1) using the thus identified pulsatile component (AC) and nonpulsatile component (DC) is preferably equal to or greater than 0.5% because it is not susceptible to the effect of noise during measurement. In particular, in a case of usage for calculating the oxygen saturation, it is more preferable that the PI value should be equal to or greater than 1.0%.

Expression (1)

$$PI(\%) = AC/DC \times 100.$$

[Entire Configuration Example of Photoelectric Volume Pulse Wave Sensor]

Any of various embodiments and modes can be adopted as the entire configuration of the photoelectric volume pulse wave sensor.

Preferably, the basic entire configuration is a configuration that includes: a light-emitting element that is driven in a blinking manner at a frequency higher than a frequency of volume pulse waves of a living body, based on a signal of an oscillator, and emits light; a light-receiving element that receives light including emission light from the light-emitting element and external light that have been reflected by or passed through body tissue of a measurement target, and generates a signal having a signal level in accordance with the intensity of the received light; an external light extraction device that extracts an external signal component due to the external light from the signal generated by the light-receiving element; a body motion detection device that detects a body motion signal component due to body motion; a reduction device that reduces a noise signal due to the external light, body motion and the like in the signal generated by the light-receiving element, by subtracting, from the signal generated by the light-receiving element, an external light signal component extracted by the external light extraction device and a body motion detection signal component detected by the body motion detection device; and a device that generates a signal representing the volume pulse waves of the living body as the measurement target, based on a signal in which the noise signal component due to the external light, the body motion and the like has been reduced by the reduction device.

[Configuration Elements of Photoelectric Volume Pulse Wave Sensor]

Among the various configuration elements of the photoelectric volume pulse wave sensor, the light-emitting element, the light-receiving element, and the elastic dielectric layer, which are main elements, are described.

<Light-Emitting Element>

In the present invention, the light-emitting element is used as a light source of light with which body tissue is irradiated.

Any of an organic light-emitting diode (OLED) and an inorganic light-emitting diode (LED) may be used as the light-emitting element. Although not specifically limited, it is preferable to use an organic electroluminescent element (also called an organic electroluminescent diode: "OLED", "organic EL element", and "organic photodiode") that is a light-emitting element including a planar organic layer, as the light-emitting element according to the present invention because the element is flexible, has a favorable fit, and can reduce wavelength variation and luminance variation.

In particular, it is preferable to have a configuration in which a wavelength conversion filter that converts visible light from an organic EL element into near-infrared light (IR) is arranged on the organic EL element that emits red light.

Alternatively, an LED and a light guide plate may be used as the planar light-emitting element. For backlight for a display, a scheme is adopted in which an LED is arranged at an edge of a light guide plate, and light enters a side edge of the light guide plate.

Further alternatively, a micro-LED with a resolution that can be assumed as a plane may be used. In order to alleviate local increase in luminance immediately above the LED, it is preferable to provide a scattering layer.

(Organic EL Element)

Figure 5A:
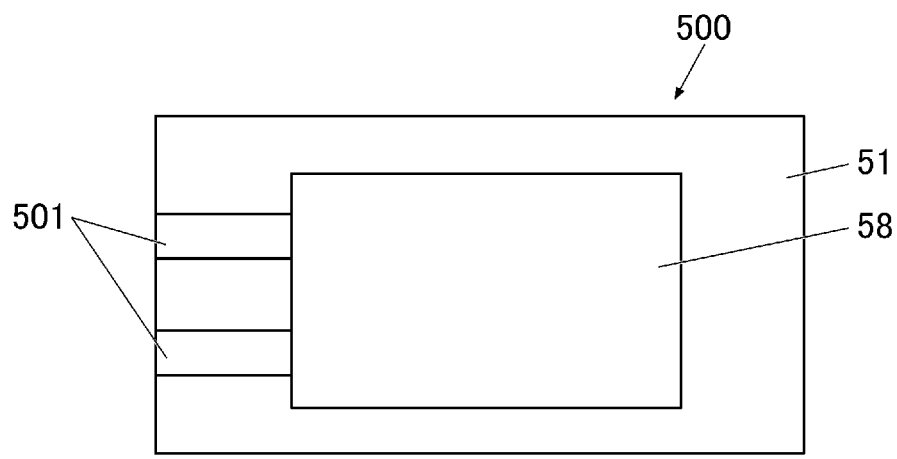
FIG. 5A is a schematic plan sectional view of an organic EL element.
Figure 5B:
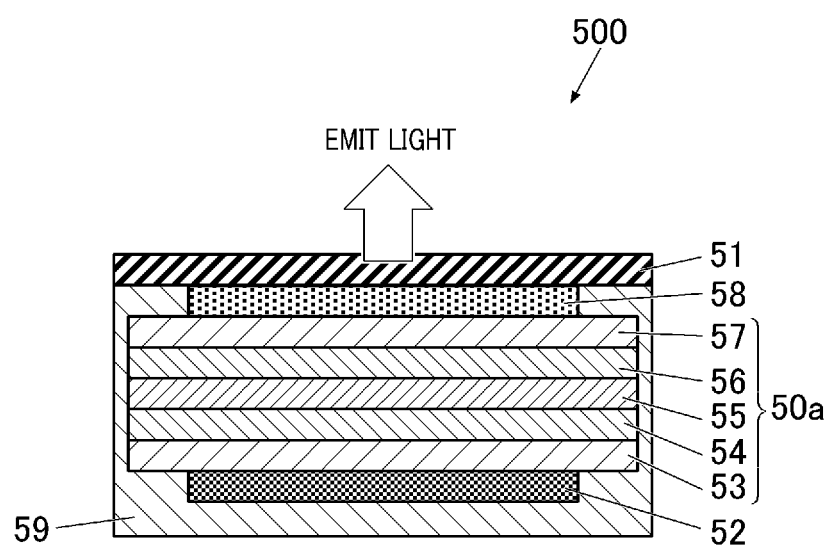
FIG. 5B is a schematic sectional view showing an example of a configuration of an organic EL element.

FIG. 5A is a schematic plan sectional view of an organic EL element. FIG. 5B is a schematic sectional view showing an example of the configuration of the organic EL element.

For example, as shown in FIGS. 2, 4, 5A, and 5B, the organic EL element 500 that is preferable in the present invention may have a configuration that includes an anode 58 and a cathode 52 on a flexible resin substrate 51, and a group that includes a light-emitting function layer 50a ("organic function layer" or "organic layer") including a light emitting-layer 55 and is interposed between the anode 58 and the cathode 52 at opposite positions. Furthermore, according to a purpose, function layers that include a sealing member 59, and a gas barrier layer and a light extraction layer, not shown, may be appropriately combined to achieve a configuration.

Representative configuration examples of the organic EL element according to the present invention are described below. However, the configuration of the organic EL element applicable to the present invention is not limited to these exemplified configurations. Note that FIG. 5B is a sectional view showing a case of a configuration (7) described below.

(1) Anode/light-emitting layer/cathode
(2) Anode/light-emitting layer/electron transport layer/cathode
(3) Anode/hole transport layer/light-emitting layer/cathode
(4) Anode/hole transport layer/light-emitting layer/electron transport layer/cathode
(5) Anode/hole transport layer/light-emitting layer/electron transport layer/electron injection layer/cathode
(6) Anode/hole injection layer/hole transport layer/light-emitting layer/electron transport layer/cathode
(7) Anode 58/hole injection layer 57/hole transport layer 56/(electron stopping layer/) light-emitting layer 55/ (hole stopping layer/) electron transport layer 54/electron injection layer 53/cathode 52

In FIG. 5A, symbol 501 denotes extraction electrodes.

In the organic EL element, an electric field is applied from the outside, holes are injected from the anode into the hole transport layer, and electrons are injected from the cathode into the electron transport layer. Injected carriers hop between molecules. Holes and electrons are recombined in the light-emitting layer, and electrically neutral excitons are generated. The excitons emit light according to the luminescent quantum efficiency, and are radiatively deactivated. The light caused in the organic layer can be extracted from an extraction layer to air.

Details of specific configuration layers constituting an organic EL element applicable to the present invention, and a method of manufacturing them are not specifically limited. Publicly known configuration materials and manufacturing methods are applicable. For example, content described in Japanese Patent Laid-Open Nos. 2013-089608, 2014-120334, and 2015-201508, and International Publication WO2018/51617 can be referred to.

(Wavelength Conversion Filter)

Preferably, the organic EL element according to the present invention is provided with a wavelength conversion filter that converts visible light from the organic EL element into near-infrared light.

Preferably, the wavelength conversion filter according to the present invention contains a luminescent material (e.g., emitting dye etc.) that has a wavelength conversion capability. The mode, manufacturing method and the like of the wavelength conversion filter according to the present invention are not specifically limited only if the filter contains an emitting dye that has a wavelength conversion capability, and are appropriately determined in accordance with the object and usage.

The wavelength conversion filter according to the present invention absorbs light from the organic EL element that emits light in a visible light region including a near-infrared light region (380-780 nm), preferably in a green to red region including a near-infrared light region (495-750 nm), particularly preferably in a red region (600-700 nm), and emits light in a region of near-infrared light, for example, exceeding 700 nm and equal to or lower than 1500 nm, and furthermore it is preferable that it has a function of conversion into near-infrared light having an emission maximum around 850 nm.

Even with a method of separately manufacturing the wavelength conversion filter and the organic EL element and achieving fabrication by bonding them together, a wavelength conversion filter may be directly applied and laminated on the organic EL element. A cut filter for cutting off light having not been wavelength-converted and been radiated may be laminated or included as needed.

In view of reduction in size and maintenance of flexibility, the thickness of the wavelength conversion filter according to the present invention is preferably in a range of 0.01-1000 μm, more preferably in a range of 1-500 μm, and further preferably in a range of 10-300 μm.

The wavelength conversion filter according to the present invention may include not only the emitting dye but also well-known various additives, such as colorant, light stabilizer, antioxidant agent, surfactant, fire-retardant, inorganic additive, clarifying agent, ultraviolet absorber, filler, or light scattering particles, as needed.

<Light-Receiving Element>

The light-receiving element according to the present invention functions as a sensor that detects light reflected by body tissue in light emitted from the light-emitting element to the body tissue, and converts the light into electricity.

Any of a planar inorganic or organic photodiode (OPD), and an organic thin-film photovoltaics (organic photovoltaics: OPV) can be used as the light-receiving element. In particular, it is preferable to use an OPD because it is flexible, has a favorable fit, and can reduce wavelength variation and luminance variation.

(1) Organic Photodiode

A conventionally publicly known organic photodiode (also called "OPD" or "organic PD") can be used as the light-receiving element according to the present invention.

Figure 6A:
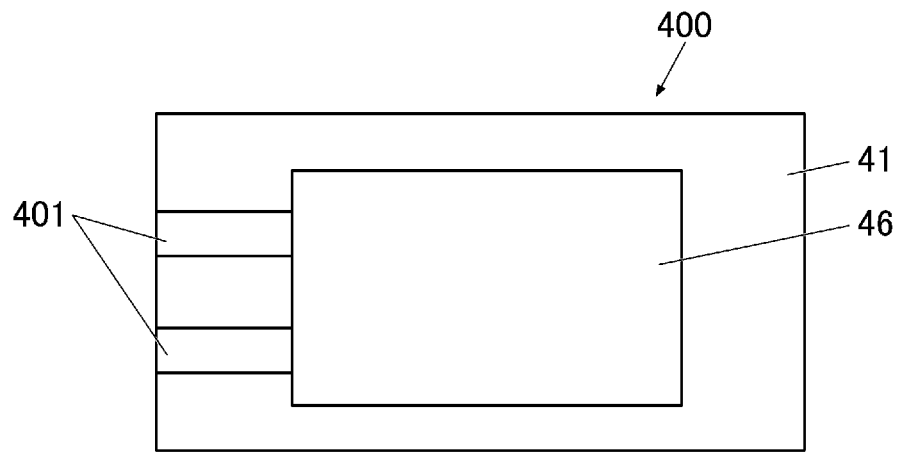
FIG. 6A is a schematic plan sectional view of an organic photodiode.
Figure 6B:
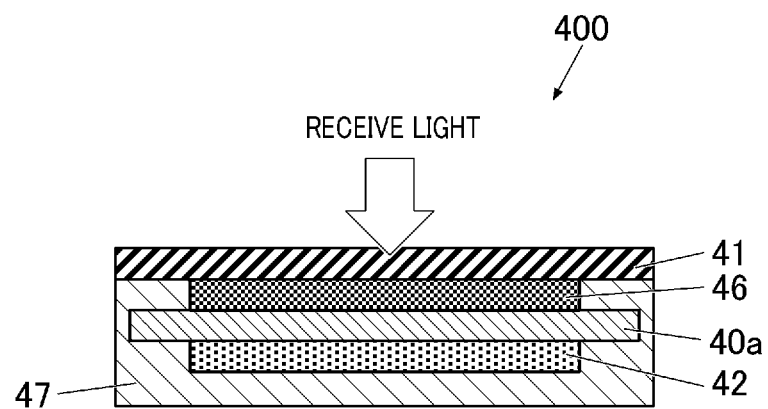
FIG. 6B is a schematic sectional view showing an example of a configuration of an organic photodiode.

FIGS. 6A and 6B are schematic diagrams of the organic photodiode. FIG. 6A is a plan sectional view. FIG. 6B is a sectional view showing an example of the configuration.

For example, as shown in FIGS. 2, 4, 6A, and 6B, the organic photodiode 400 has basic configuration elements that include: a cathode 46 that is made of a metal formed on a substrate 41, such as a light transmissive resin, glass or the like, by a sputtering method, a resistance heating evaporation method or the like; a light-receiving function layer 40a film-formed on the cathode 46 by the resistance heating evaporation method or the like; and an anode 42 that includes a transparent conductive film, such as of ITO (Indium-Tin Oxide), formed on the light-receiving function layer 40a by the resistance heating evaporation method or the like in the same manner. According to a purpose, function layers including a sealing member 47 may be appropriately combined to achieve a configuration. In FIG. 6A, symbol 401 denotes extraction electrodes.

When the organic photodiode having such a configuration is irradiated with light, light absorption occurs in a photoelectric conversion region, and excitons are formed. Subsequently, carriers are separated, electrons move to the cathode through the light-receiving function layer, and holes move to the anode through the light-receiving function layer. Accordingly, an electromotive force occurs between both the electrodes. By connecting an external circuit, an electrical signal can be taken out.

The light-receiving function layer can be made up of a single layer or multiple layers. The light-receiving function layer may have, for example, any of various combinations that include an intrinsic layer (I layer), p-type layer/I layer, I layer/n-type layer, p-type layer/I layer/n-type layer, and p-type layer/n-type layer.

For example, what has a configuration shown in FIG. 13D in U.S. Patent Application Publication No. 2017/0156651 can be used. As for various organic materials and the like used for the organic photodiode, Japanese Translation of International Publication WO2017/532546 and Japanese Patent Laid-Open No. 2006-261172, Nature Electronics volume 3, pages 113-121 (2020) and the like can be referred to.

(2) Organic Thin-Film Photovoltaics

Any of conventionally publicly known various modes of organic thin-film photovoltaics (OPV) can be used as the light-receiving element according to the present invention.

For example, a bulk heterojunction type organic photoelectric conversion element can be used that has a basic configuration where an anode that is a transparent electrode, a hole transport layer, an photoelectric conversion layer that is a bulk heterojunction layer, an electron transport layer, and a cathode are sequentially laminated on one surface of a substrate.

Note that another layer, such as a hole blocking layer, an electron blocking layer, an electron injection layer, a hole injection layer, or a smoothing layer, may be included.

Note that the photoelectric conversion layer is a layer that converts light energy into electrical energy, and includes a bulk heterojunction layer in which a p-type semiconductor material, and an n-type semiconductor material are homogenously mixed.

The p-type semiconductor material relatively functions as an electron donor (donor). The n-type semiconductor material relatively functions as an electron acceptor (acceptor).

Here, the electron donor and the electron acceptor are "the electron donor and the electron acceptor where when light is absorbed, electrons move from the electron donor to the electron acceptor, and pairs of holes and electrons (charge-separated state) are formed", do not simply provide or accept electrons unlike an electrode, but do provide or accept electrons by light response.

For the sake of further improving the solar utilization rate (photoelectric conversion efficiency), a tandem-type configuration (a configuration including multiple bulk heterojunction layers) where such photoelectric conversion elements are laminated may be adopted.

The p-type semiconductor material may be any of various condensed polycyclic aromatic compounds, and conjugated compounds.

Examples of the n-type semiconductor material include high polymer compounds that include aromatic carboxylic anhydrides, such as fullerene, octaazaporphyrin, p-type semiconductor perfluoro body, naphthalene tetracarboxylic acid anhydride, naphthalenetetracarboxylic acid diimide, perylenetetracarboxylic acid anhydride, and perylenetetracarboxylic acid diimide, or imide compounds thereof, as skeletons.

<Elastic Dielectric Layer>

The elastic dielectric layer functions as a capacitor in a capacitive pressure sensor that includes at least one electrode (body motion detection electrode) among electrodes constituting the light-emitting element and the light-receiving element, and a measurement site of a living body assumed as the other electrode.

Figure 7A:
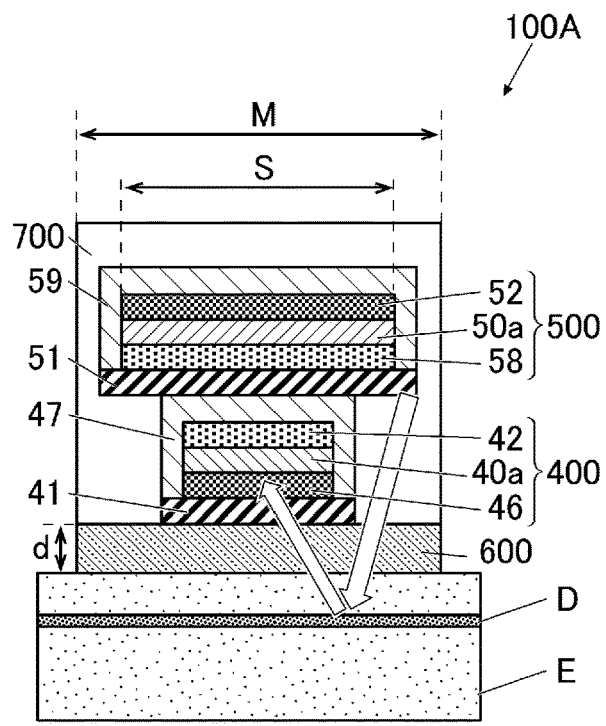
FIG. 7A is a schematic sectional view of a reflective photoelectric volume pulse wave sensor attached to a measurement site.
Figure 7B:
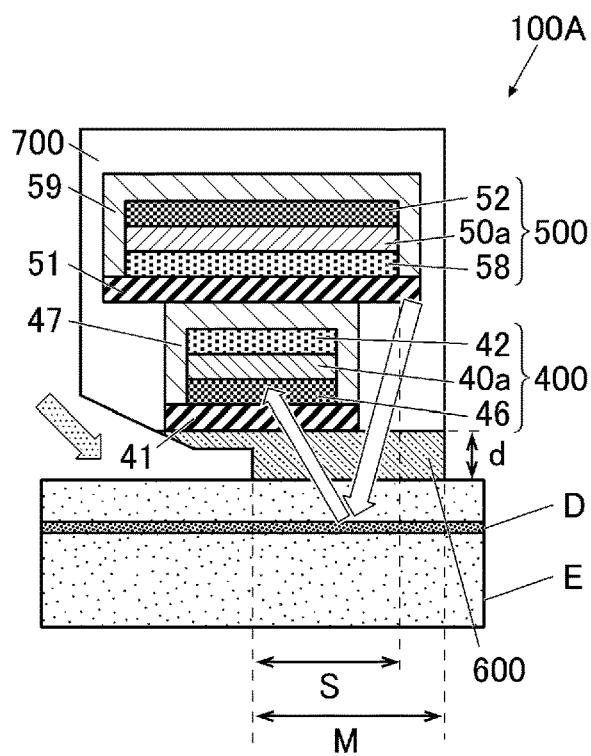
FIG. 7B is a schematic sectional view of a reflective photoelectric volume pulse wave sensor attached to a measurement site.
Figure 7C:
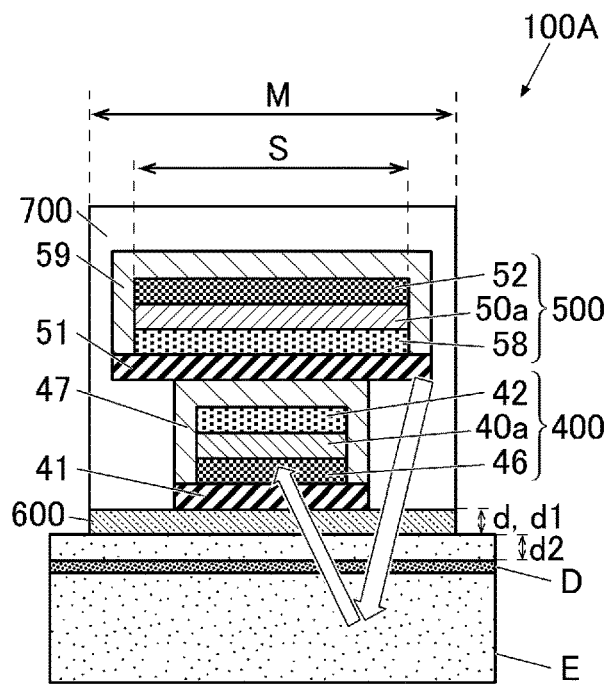
FIG. 7C is a schematic sectional view of a reflective photoelectric volume pulse wave sensor attached to a measurement site.

FIGS. 7A to 7C are schematic sectional views of a reflective photoelectric volume pulse wave sensor attached to a measurement site. Note that symbols in FIGS. 7A to 7C have the same meanings as the symbols in FIG. 2. Accordingly, the description thereof is omitted.

Here, when the contact area of a location overlapping the body motion detection electrode in the contact area of the elastic dielectric layer 600 in contact with the measurement site in plan view is assumed as S, the electrostatic capacitance C increases with increase in contact area S, as evident from the following expression. When the thickness of the elastic dielectric layer 600 is assumed as d, the electrostatic capacitance C increases with reduction in thickness d of the elastic dielectric layer 600 due to pressure application.

$$C = \varepsilon \cdot S/d$$

[$\varepsilon$: permittivity of space (F/m), d: thickness (distance) of elastic dielectric layer (m), S: contact area (m$^2$) at a location overlapping the body motion detection electrode in the contact area of the elastic dielectric layer in contact with the measurement site in plan view]

Note that in the Expression described above, "the contact area S of a location overlapping the body motion detection electrode in the contact area of the elastic dielectric layer in contact with the measurement site in plan view" is the area portion S corresponding to the location where the elastic dielectric layer 600 and the body motion detection electrode (e.g., the anode 58 of the light-emitting element 500) overlap in the contact area M of the elastic dielectric layer 600 in contact with the measurement site in plan view, as shown in FIG. 7A. Also in cases of FIGS. 7B and 7C, when the body motion detection electrode is the anode 58 of the light-emitting element 500, an area portion denoted by a symbol S in the elastic dielectric layer 600 is assumed as the contact area S.

On the other hand, also in the case of the transmissive photoelectric volume pulse wave sensor shown in FIG. 4, it is the area portion S corresponding to the location where the elastic dielectric layer 600 and the body motion detection electrode (e.g., the anode 58 of the light-emitting element 500) overlap in plan view.

Note that the above description is on the case where the body motion detection electrode is assumed as the anode 58 of the light-emitting element 500. In a case where the body motion detection electrode is assumed as the cathode 52 of the light-emitting element 500, or the anode 42 or the cathode 46 of the light-receiving element 400, the area portion corresponding to the location where the elastic dielectric layer 600 and the corresponding electrode overlap is assumed as the contact area S.

Furthermore, in the Expression described above, "thickness d of the elastic dielectric layer" is the distance from the surface of the elastic dielectric layer 600 in contact with the measurement site to the surface of the elastic dielectric layer 600 in contact with the substrate 41 (the portion of symbol d in FIGS. 7A to 7C). Note that also in FIG. 2, it indicates the part of symbol d.

In the case of the transmissive photoelectric volume pulse wave sensor in FIG. 4, when the body motion detection electrode is assumed as the electrode (the anode 58 or the cathode 52) of the light-emitting element 500, the thickness of the elastic dielectric layer 600 closer to the light-emitting element is assumed as "thickness d of the elastic dielectric layer" in the Example described above, and when the body motion detection electrode is assumed as the electrode (the anode 42 or the cathode 46) of the light-receiving element 400, the thickness of the elastic dielectric layer 600 closer to light-receiving element side is assumed as "thickness d of the elastic dielectric layer" in the expression described above.

FIG. 7A shows a state in which the entire surface of the elastic dielectric layer 600 is in contact with the measurement site, without failure in close contact, and no pressure is applied.

In FIG. 7B, the contact area with the measurement site is smaller than the elastic dielectric layer 600 in FIG. 7A, and causes failure in close contact. In the state, no pressure is applied. Consequently, since the living body is irradiated with external light and the area S decreases owing to the failure in close contact, reflection occurs on a skin surface, and the pulsatile component (AC) in pulse wave data becomes resistant to increasing. That is, the nonpulsatile component (DC) increases, and the electrostatic capacitance decreases.

In FIG. 7C, by pressure application in the state in FIG. 7A, the thickness d1 of the elastic dielectric layer 600 and the thickness d2 of body tissue to the arteries D become thinner. Accordingly, absorption of light by the living body decreases, and the electrostatic capacitance increases.

As described above, through the elastic dielectric layer 600 and the body motion detection electrode, based on variation in electrostatic capacitance C, the close contact property with and pressure application to the measurement site can be detected.

Here, it is preferable that the contact area S should be equal to or greater than 200 mm$^2$, and more preferably, in a range of 200-600 mm$^2$.

It is preferable that the pressure applied to the measurement site of the living body should be equal to or greater than 0.02 N/cm$^2$, and more preferably, equal to or less than 3 N/cm$^2$.

Note that the pressure applied to the measurement site of the living body can be controlled by changing the thickness d of the elastic dielectric layer 600, for example. Specifically, it is preferable that the thickness d should be in a range of 0.1-1 mm.

A material mainly used for a flexible substrate of an organic EL element or a flexible transmissive resin can be used for the elastic dielectric layer 600. For example, polyester, such as polyethylene terephthalate (PET), or polyethylene naphthalate (PEN), cellulosic esters or their derivatives, such as polyethylene, polypropylene, cellophane, cellulose diacetate, cellulose triacetate (TAC), cellulose acetate butyrate, cellulose acetate propionate (CAP), cellulose acetate phthalate, or cellulose nitrate, or polyvinylidene chloride, polyvinyl alcohol, polyethylene vinyl alcohol, syndiotactic polystyrene, polycarbonate, norbornene resin, polymethylpentene, polyetherketone, polyimide, polyether sulfone (PES), polyphenylenesulfide, polysulfones, polyetherimide, polyether ketone imide, polyamide, fluorine resin, nylon, silicone resin, polyurethane, polymethylmethacrylate, acrylic, or polyarylates, or cycloolefin resin, such as ARTON (trade name, made by JSR Corporation) or APEL (trade name, made by Mitsui Chemicals, Inc.) may be adopted. Preferably, silicone resin or polyurethane may be adopted.

[Biological Information Measurement Device]

The photoelectric volume pulse wave sensor according to the present invention is applicable to various forms of biological information measurement devices according to a purpose.

Application examples are described below.

Figure 8:
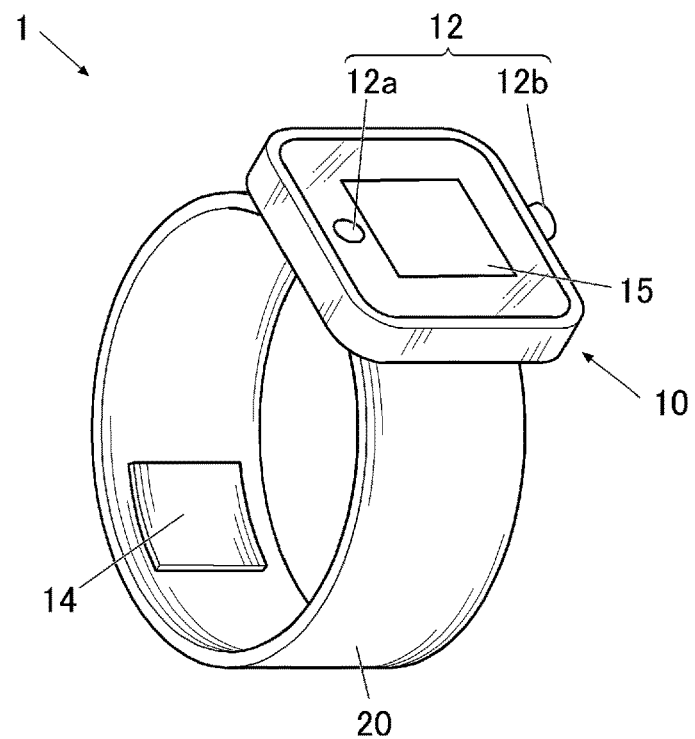
FIG. 8 is a perspective view of a biological information measurement device that includes a reflective photoelectric volume pulse wave sensor that can be wrapped around a wrist.

FIG. 8 is a perspective view of a biological information measurement device that includes a reflective photoelectric volume pulse wave sensor that can be wrapped around a wrist.

The biological information measurement device 1 includes a main body 10 to be worn around a wrist of a patient as with a wristwatch. Specifically, the main body 10 includes a belt 20, and can be worn around a wrist of a patient by the belt 20. On an inner side of the belt 20, a detector 14 is arranged that includes the light-emitting element 500, the light-receiving element 400, and the elastic dielectric layer 600 described above. The detector 14 and the main body 10 are electrically connected to each other.

The main body 10 is formed to have a flat shape. Around and on a surface thereof, an operation receiver 12, and a display 15 are provided. An electrical circuit and the like (see FIG. 9) that has functions equivalent to a controller 11, a recorder 13 and the like is stored therein.

The operation receiver 12 includes, for example, a power source switch 12a, and a timing switch (operation switch) 12b.

Figure 9:
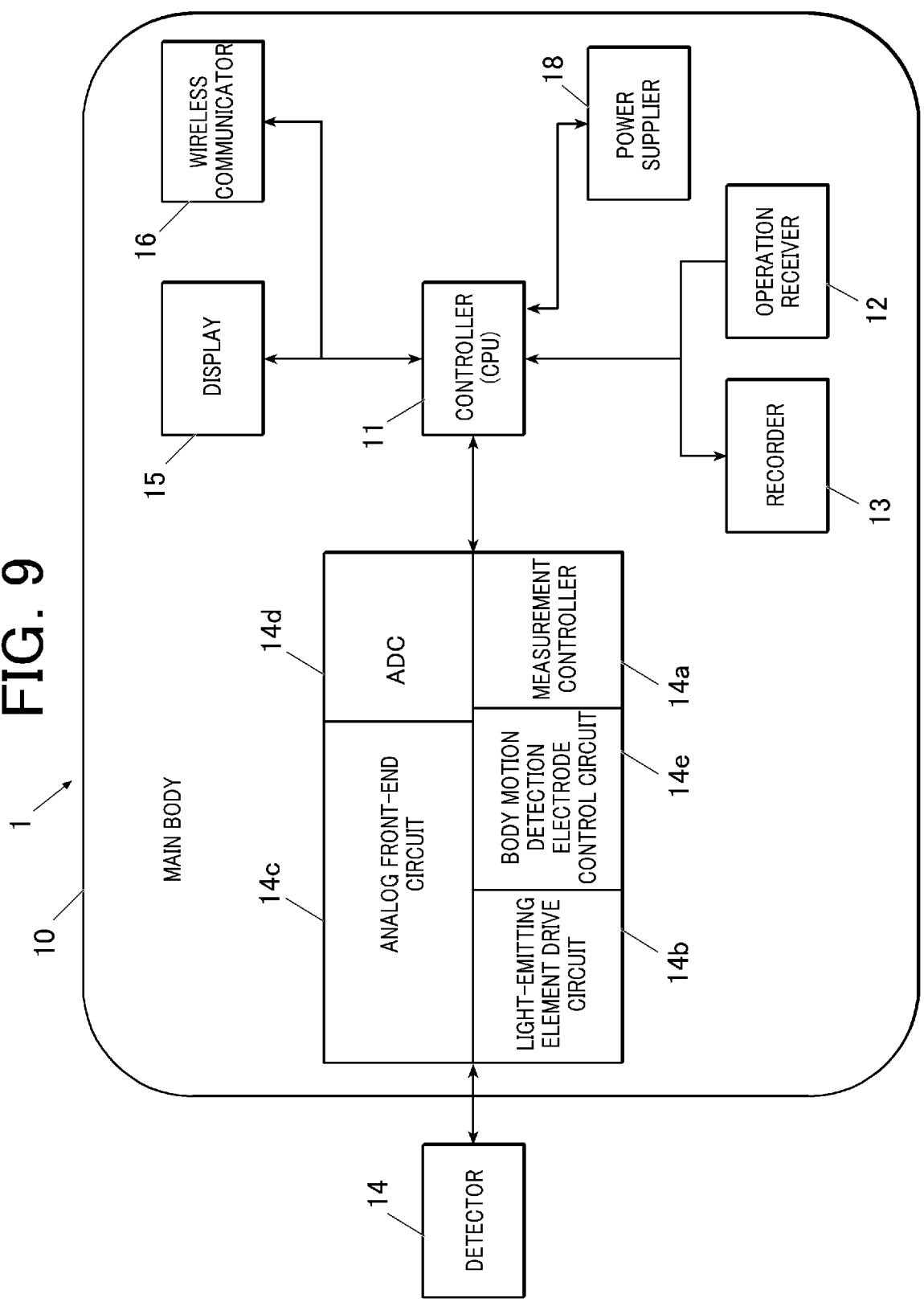
FIG. 9 shows a functional configuration example of the biological information measurement device.

FIG. 9 shows a functional configuration example of the biological information measurement device 1. As shown in FIG. 9, the biological information measurement device 1 includes the controller 11, the operation receiver 12, the recorder 13, the detector 14, the display 15, a wireless communicator 16, and a power supplier 18.

The controller 11 includes a CPU (central processing unit), and a RAM (random access memory). The CPU of the controller 11 reads various programs, such as system programs and processing programs, stored in the recorder 13, loads the programs into the RAM, and executes various processes according to the loaded programs.

The controller 11 performs a pulse wave detection process (see FIG. 10) as described later. Specifically, the controller 11 performs a process that optimizes pulse wave data obtained by allowing light emitted from the light-emitting element 500 into a living body to be reflected on the inside of the living body and enter the light-receiving element 400, and body motion data obtained by variation in electrostatic capacitance at the body motion detection electrode and the measurement site, respectively, and obtains the difference.

Furthermore, in a case where a pulsatile component in a signal corresponding to an absorbance of light detected by the light-receiving element 400 is assumed as AC, and a nonpulsatile component is assumed as DC, the controller 11 performs a process that displays an error indication if a perfusion index (PI) represented by the above Expression (1) is less than 0.5%, and determines normality and performs measurement if the PI is equal to or higher than 0.5%.

The operation receiver 12 is a detector that detects an instruction by an operator, includes various switches and various function buttons, and outputs their operation signals to the controller 11.

The recorder 13 includes a semiconductor nonvolatile memory. The recorder 13 records system programs and various programs required to cause the biological information measurement device 1 in this embodiment to function, and parameters, files and the like required to execute the programs.

For example, the recorder 13 sequentially records vital data under measurement, from the start of measurement to the end of measurement. Note that it may be configured so that from the start of measurement to the end of measurement, the vital data is recorded at constant time intervals.

The detector 14 is a data obtainer to which the photoelectric volume pulse wave sensor 100A or 100B (see FIGS. 2, 4, etc.) is applied, and which obtains vital data on a patient, includes the light-emitting element 500 and the light-receiving element 400 as described above, and preferably includes the elastic dielectric layer 600, and is configured to be attachable to the measurement site, such as a wrist. Note that the photoelectric volume pulse wave sensor in this case is a reflective type one, but may be a transmissive type one instead.

The detector 14 causes a measurement controller 14a to control a light-emitting element drive circuit 14b, causes the light-emitting element 500 included in the detector 14 to emit red light and infrared light toward a living body site, and transmits, to an analog front-end circuit 14c, an analog signal of reflected light from the measurement site having received light by the light-receiving element 400 included in the detector 14. The detector 14 causes the measurement controller 14a to control a body motion detection electrode control circuit 14e, flow current to at least one electrode (body motion detection electrode) among electrodes constituting the light-emitting element 500 or the light-receiving element 400 included in the detector 14, and transmit an analog signal of body motion detected by the body motion detection electrode to the analog front-end circuit 14c. Based on the analog signal of the reflected light and the body motion, noise is removed and the signal is amplified, a voltage signal to be input into an AD converter 14d is prepared and subsequently converted into digital data by the AD converter 14d.

After conversion into the digital data by the AD converter 14d, the controller 11 calculates $SpO_2$, pulse rate, and vital data on arteriosclerosis and the like, based on the digital data. The calculated vital data is recorded in the recorder 13.

The display 15 includes, for example, an LCD (Liquid Crystal Display), and performs, for example, dot-matrix displaying, and performs displaying according to an instruction of a display signal input from the controller 11.

The wireless communicator 16 includes a wireless interface for transmitting and receiving data to and from an information processing apparatus 3 through wireless communication, such as of Bluetooth® or Wi-Fi®, for example.

The power supplier 18 supplies power required by components of the biological information measurement device 1 for operation, to the components. The power supplier 18 supplies power output from a battery, not shown, at operation voltages of the respective components.

Figure 10:
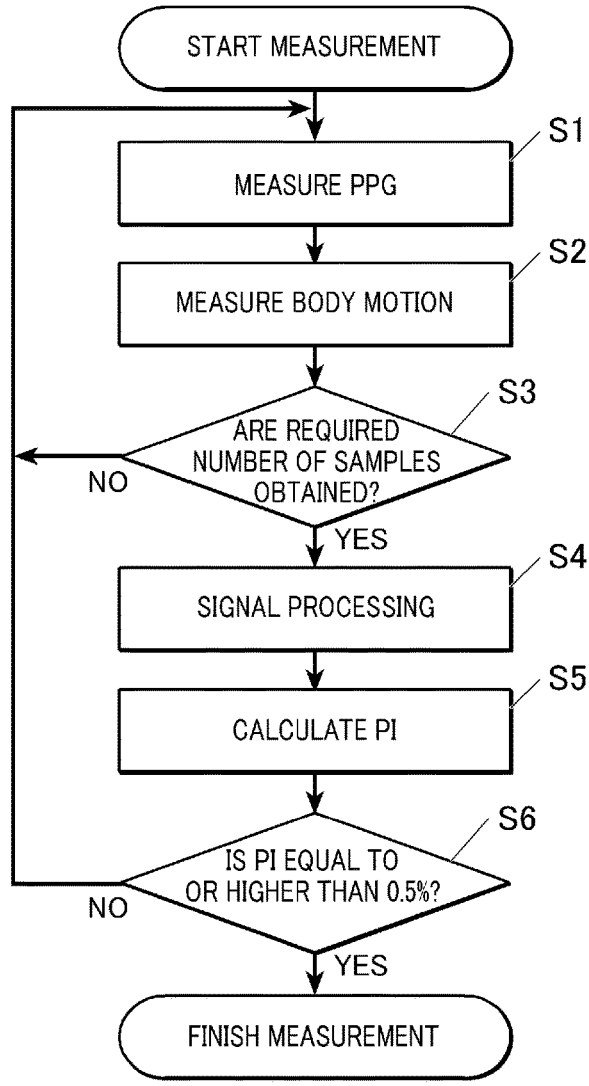
FIG. 10 is a flowchart showing an example of a pulse wave detection process.
Figure 11:
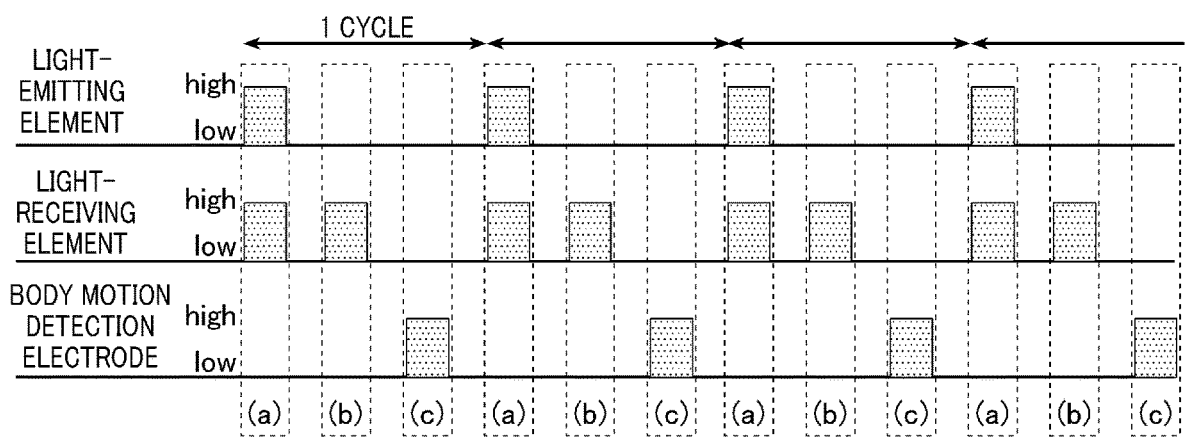
FIG. 11 shows a driving method for a light-emitting element, a light-receiving element, and a body motion detection electrode.

Next, an example of a process performed by the controller 11 in the biological information measurement device 1 configured as described above is described below with reference to FIG. 10. FIG. 10 is a flowchart showing an example of a pulse wave detection process. FIG. 11 shows a driving method for the light-emitting element, the light-receiving element, and the body motion detection electrode.

First, the controller 11 drives the light-emitting element 500 and the light-receiving element 400, and measures pulse waves (PPG) (see Step S1, and (a) processing stage in FIG. 11). That is, light emitted from the light-emitting element 500 into the living body is reflected on the inside of the living body, and enters the light-receiving element 400, thus obtaining pulse wave data.

The light-emitting element 500 and the light-receiving element 400 are driven, and the pulse wave data is obtained, and subsequently, only the light-receiving element 400 is driven. Since the light-emitting element 500 is not driven, only light due to external light is received by the light-receiving element 400 and measured (see (b) processing stage in FIG. 11).

Next, body motion is measured (see Step S2, and (c) processing stage in FIG. 11). That is, body motion data is obtained by variation in electrostatic capacitance at the body motion detection electrode and the measurement site.

It is determined whether a required number of samples of the pulse wave data and the body motion data are obtained or not (Step S3). If it is determined that the required number of samples are not obtained (Step S3: NO), (a)-(c) processing stages in FIG. 11 are assumed as one cycle and (a)-(c) processing stages are repeated until the required number of samples are obtained (Steps S1 and S2).

Note that an interval between (a) processing stage and (b) processing stage, and an interval between (b) processing stage and (c) processing stage in FIG. 11 are periods during which no adverse effect of charge and discharge due to a transient phenomenon is exerted.

If it is determined that the required number of samples are obtained (Step S3: YES), the following signal processing is executed (Step S4).

Specifically, a process is performed that subtracts external light data obtained by the light-receiving element receiving only light due to external light in (b) processing stage in FIG. 11, from the pulse wave data obtained in (a) processing stage in FIG. 11 described above (external light removing process). Furthermore, preprocesses, such as a smoothing process of removing electrical noise, and a process of aligning the signal intensities of the optically obtained pulse wave data and the capacitively obtained signal intensity of body motion data with each other, are performed using image processing filters, such as a bandpass filter and a moving average filter. A process of obtaining the difference of the body motion data from the thus preprocessed pulse wave data is performed. Accordingly, accurate pulse wave data with the body motion data being removed is obtained.

Next, to output more reliable pulse wave data, a pulsatile component of a signal corresponding to the absorbance of light detected by the light-receiving element 400 is assumed as AC, a nonpulsatile component is assumed as DC, the AC and DC are calculated, and the perfusion index (PI=AC/DC) is calculated (Step S5).

It is determined whether or not the PI is equal to or higher than 0.5% (Step S6). If it is less than 0.5% (Step S6: NO), an error indication is displayed, PPG measurement is performed again (Step S1). If it is equal to or higher than 0.5% (Step S6: YES), it is determined to be normal, and the measurement is finished.

(Configuration of Biological Information Processing Apparatus)

The information processing apparatus 3 is an apparatus that can analyze vital data transmitted from the biological information measurement device 1. The information processing apparatus 3 may be, for example, a smartphone, a tablet, a PC (Personal Computer) or the like. However, there is no specific limitation.

Figure 12:
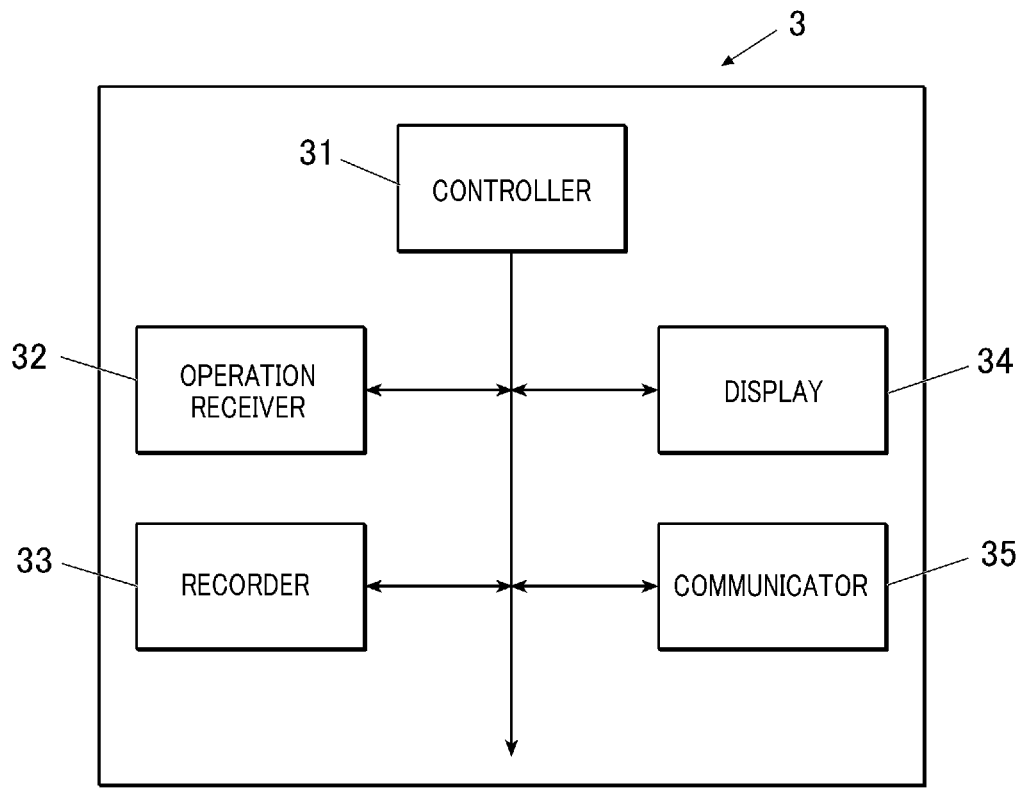
FIG. 12 shows a functional configuration example of an information processing apparatus.

FIG. 12 shows a functional configuration example of the information processing apparatus 3. As shown in FIG. 12, the information processing apparatus 3 includes, for example, a controller 31, an operation receiver 32, a recorder 33, a display 34, and a communicator 35.

The controller 31 includes a CPU, and a RAM. The CPU of the controller 31 reads various programs, such as system programs and processing programs, stored in the recorder 33, loads the programs into the RAM, and executes various processes according to the loaded programs.

Specifically, the controller 31 performs a process of analyzing vital data obtained based on light emitted from the light-emitting element 500 in the biological information measurement device 1.

The operation receiver 32 includes various switches, various function buttons, and a touch panel, and outputs their operation signals to the controller 31.

The recorder 33 includes a semiconductor nonvolatile memory. The recorder 33 records system programs and various programs, and parameters, files and the like required to execute the programs.

For example, the recorder 33 records the vital data output from the biological information measurement device 1.

The display 34, which includes a monitor such as a CRT (Cathode Ray Tube) or an LCD (liquid crystal display), displays various kinds of screens in accordance with an instruction of a display signal input from the controller 31.

The communicator 35 includes an interface for transmitting and receiving data to and from the biological information measurement device 1 through wireless communication, such as of Bluetooth and Wi-Fi. The communicator 35 may include a wired interface, such as of USB.

EXAMPLES

Hereinafter, Examples are exemplified and the present invention is specifically described. However, the present invention is not limited to them. Note that in the following Examples, operation was performed at room temperature (25° C.) unless otherwise specified.

Example 1: Variation in Electrostatic Capacitance by Body Motion Sensor

An organic EL element "A9F4C0A (made by KONICA MINOLTA, INC.)" was used as the light-emitting element. A silicon photodiode "KPD30S (made by KYOTO SEMICONDUCTOR Co., Ltd.)" was used as the light-receiving element. The anode of the organic EL element was connected as the body motion detection electrode to "Arduino uno R3". A reflective photoelectric volume pulse wave sensor that used a silicone resin for the elastic dielectric layer, and had the configuration shown in FIG. 2 was prepared. The area of the body motion detection electrode (the anode of the organic EL element) in plan view was 15.25 mm×15.6 mm.

Figure 13:
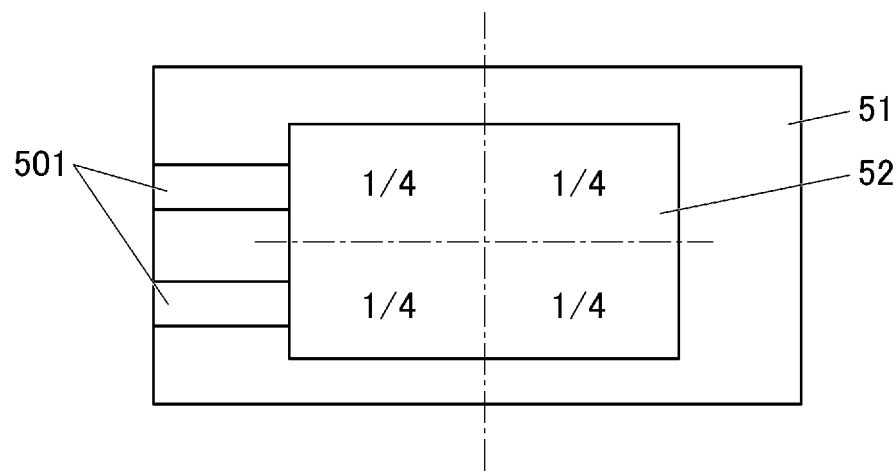
FIG. 13 is a plan sectional view for illustrating a contact area of the body motion detection electrode.
Figure 14:
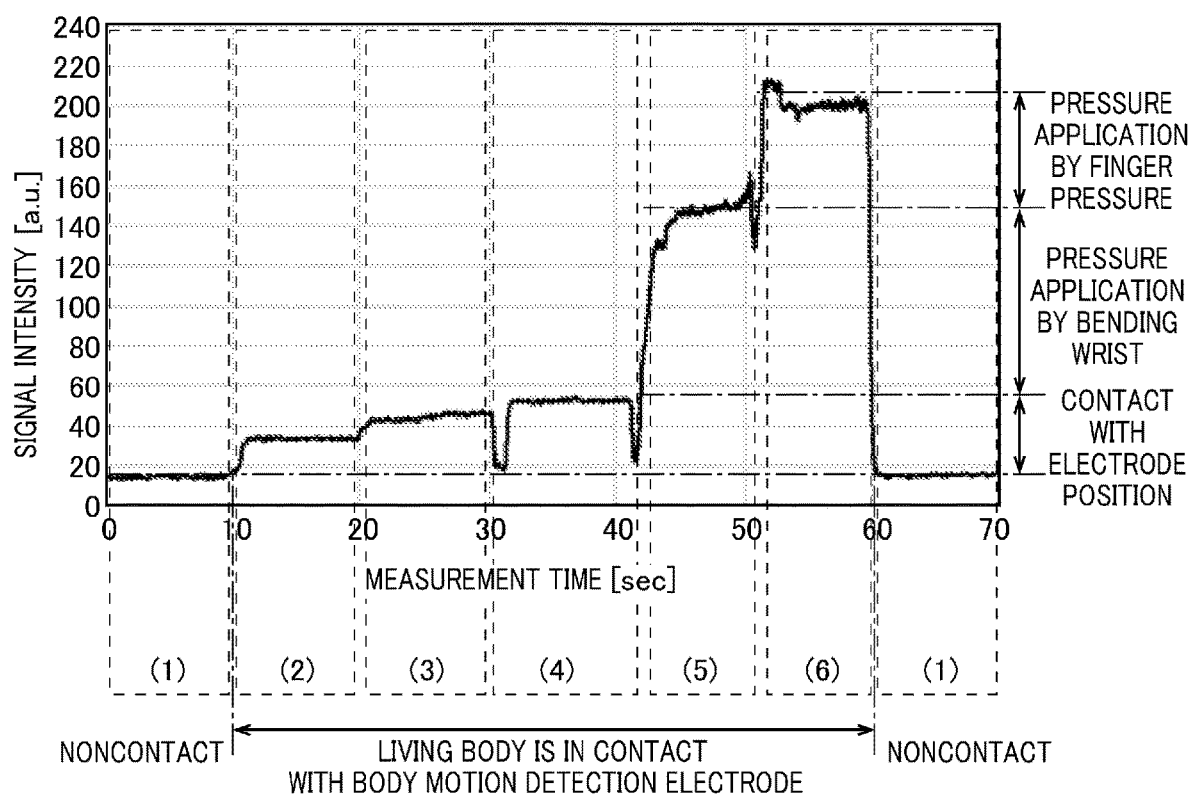
FIG. 14 shows a result of Example.

The measurement site was a wrist position (radial artery position), the light-emitting element did not emit light, current was flown to the body motion detection electrode, the electrostatic capacitance was measured under the following conditions (1)-(6), and the result was shown in FIG. 14. Note that the electrostatic capacitance value was automatically converted into a freely selected signal intensity, and displayed. FIG. 13 is a plan sectional view showing the body motion detection electrode and the substrate.

Condition (1): the elastic dielectric layer is not in contact with the measurement site (noncontact), without pressure application Condition (2): the elastic dielectric layer corresponding to an area portion of 1/4 (see FIG. 13) of the area of the body motion detection electrode is in contact with the measurement site, without pressure application Condition (3): the elastic dielectric layer corresponding to an area portion of 1/2 (see FIG. 13) of the area of the body motion detection electrode is in contact with the measurement site, without pressure application Condition (4): the elastic dielectric layer corresponding to an area portion equivalent to (one time of) (see FIG. 13) the area of the body motion detection electrode is in contact with the measurement site, without pressure application Condition (5): the elastic dielectric layer corresponding to an area portion equivalent to (one time of) (see FIG. 13) the area of the body motion detection electrode is in contact with the measurement site, in a state where the wrist is bent back Condition (6): the elastic dielectric layer corresponding to an area portion equivalent to (one time of) (see FIG. 13) the area of the body motion detection electrode is in contact with the measurement site, in a state where the wrist is bent back and an external pressure is applied by fingers The result shown in FIG. 14 shows that from the noncontact state (condition (1)), the body motion detection electrode was brought into contact with the measurement site, the signal intensity increased accordingly, and the larger the contact area was (conditions (2)-(4)), the greater the signal intensity was. It was shown that pressure application (conditions (5) and (6)) further increased the signal intensity.

Example 2: Variation in Pulse Waves Due to Pressure Application

The reflective photoelectric volume pulse wave sensor used in Example 1 was prepared.

The measurement site was the wrist position (radial artery position), and pulse waves when a state with the wrist being straight, and a state with the wrist being bent back were alternately repeated were measured using the reflective photoelectric volume pulse wave sensor. The result is shown in FIG. 15. Note that FIG. 15B shows the details of the b portion in FIG. 15A, and FIG. 15C shows the details of the c portion in FIG. 15A.

The result depicted in FIG. 15 shows that the pulse wave signal during pressure application can be clearly measured in comparison with the case without pressure application.

Figure 16:
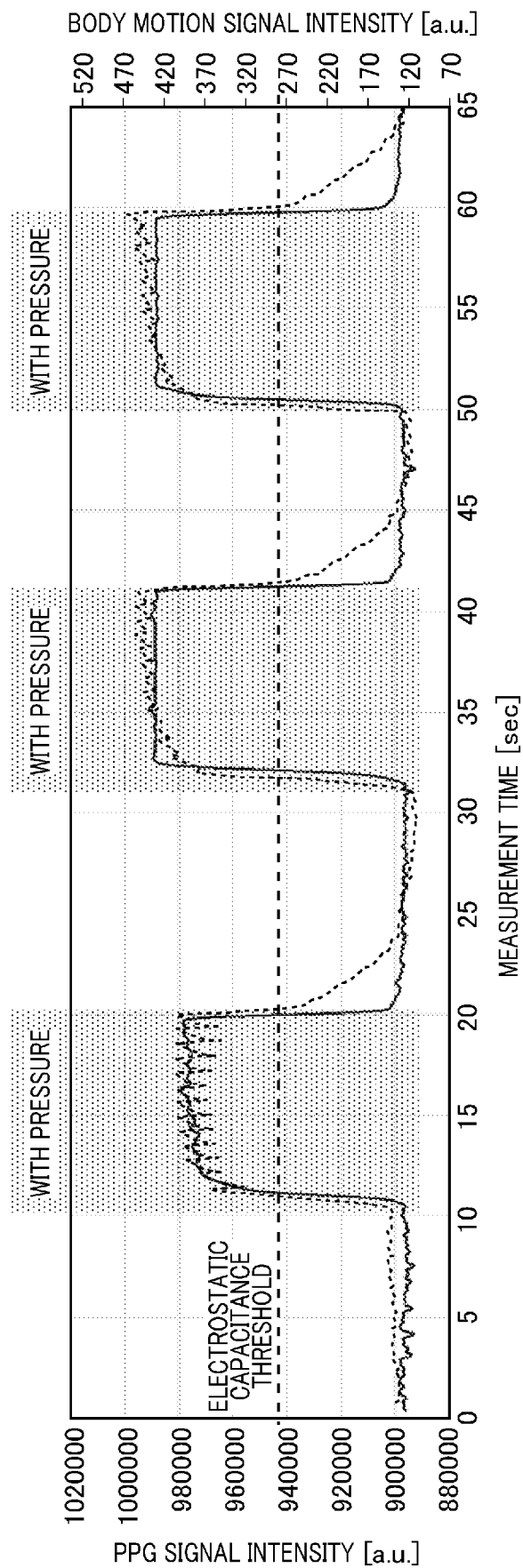
FIG. 16 shows a result of Example.

FIG. 16 shows the pulse wave data shown in FIG. 15 and the body motion data. As for the waveforms in FIG. 16, data indicated by broken lines indicates pulse wave data, and data indicated by solid lines indicates body motion data. As shown in FIG. 16, the electrostatic capacitance was increased by pressure application, and the electrostatic capacitance when the reflective photoelectric volume pulse wave sensor was in close contact with the measurement site was assumed as a threshold, and a state of being equal to or greater than the threshold was determined as a state where measurement was normally performed. Based on the obtained pulse waves, the preprocesses, such as the external light removing process and the smoothing process described above, were performed. A process of obtaining a difference of the body motion data from the preprocessed pulse waves was performed. Furthermore, AC/DC was calculated from the pulse wave data. It was determined whether AC/DC was equal to or higher than 0.5%. If it was equal to or higher than 0.5%, it was determined that pulse waves were normal and measurement was performed.

By also using at least one electrode among the electrodes constituting the light-emitting element or the light-receiving element as an electrode that detects body motion, the number of components can be small, the cost can be reduced, and body motion and pulse waves can be more accurately detected.

INDUSTRIAL APPLICABILITY

In particular, the present invention can be used for a photoelectric volume pulse wave sensor and a pulse wave detection method that require a small number of components, can lower costs, and can more accurately detect body motion and pulse waves.

REFERENCE SIGNS LIST 1 biological information measurement device
14 detector
40 light receiver
40a light-receiving function layer
42 anode
46 cathode
50 light emitter
50a light-emitting function layer
52 cathode
58 anode
100A reflective photoelectric volume pulse wave sensor
100B transmissive photoelectric volume pulse wave sensor
400 light-receiving element
500 light-emitting element
600 elastic dielectric layer
700 housing
D artery
E living body
d elastic dielectric layer
S contact area

The invention claimed is:

1. A photoelectric volume pulse wave sensor, comprising:
a light-emitting element, and
a light-receiving element,
wherein electrodes constituting the light-emitting element or the light-receiving element are surface electrodes, and at least one electrode among the electrodes is also used as an electrode that detects body motion.

2. The photoelectric volume pulse wave sensor according to claim 1, wherein light emitted to a living body transmits through the living body or is reflected by the living body, enters the light-receiving element, is photoelectrically converted, and thus allows pulse waves to be detected.

3. The photoelectric volume pulse wave sensor according to claim 1, wherein a light transmissive elastic dielectric layer that is in contact with a measurement site of a living body when the photoelectric volume pulse wave sensor is attached to the measurement site is provided on a surface of the electrode that detects the body motion.

4. A pulse wave detection method using the photoelectric volume pulse wave sensor according to claim 1, wherein electrodes constituting the light-emitting element or the light-receiving element are configured as surface electrodes, and at least one electrode among the electrodes is also used to detect body motion, comprising
optimizing pulse wave data and body motion data obtained using the photoelectric volume pulse wave sensor, and obtaining a difference therebetween.

5. The pulse wave detection method according to claim 4, wherein in a case where a pulsatile component in a signal corresponding to an absorbance of light detected by the light-receiving element is assumed as AC, and a non-pulsatile component is assumed as DC, an error indication is displayed when a perfusion index (PI) represented by the following Expression (1) is less than 0.5%, and normality is determined and measurement is performed when the PI is equal to or higher than 0.5%, Expression (1)

$$PI(\%) = AC/DC \times 100.$$

6. The pulse wave detection method according to claim 4, wherein a light transmissive elastic dielectric layer that is in contact with a measurement site of a living body when the photoelectric volume pulse wave sensor is attached to the measurement site is provided on a surface of the electrode that detects the body motion, and pulse waves and the body motion are detected.

7. The pulse wave detection method according to claim 6, wherein in plan view, a contact area at a location overlapping the electrode that detects the body motion in a contact area of the elastic dielectric layer in contact with the measurement site is configured to be equal to or larger than 200 mm$^2$.

8. The pulse wave detection method according to any one claim 4, wherein a pressure applied to a measurement site of a living body wearing the photoelectric volume pulse wave sensor is configured to be equal to or higher than 0.02 N/cm$^2$.

* * * * *